United States Patent

[11] 3,536,211

[72] Inventor Wesley G. Martin
Milwaukee, Wisconsin
[21] Appl. No. 771,431
[22] Filed Oct. 29, 1968
[45] Patented Oct. 27, 1970
[73] Assignee A. O. Smith Corporation
Milwaukee, Wisconsin
a corporation of New York

[54] DRIVE SYSTEM FOR A ROTARY CUTTER ARM
8 Claims, 5 Drawing Figs.
[52] U.S. Cl. ................................................. 214/17
[51] Int. Cl. ........................................... B65g 65/46
[50] Field of Search .......................... 214/17.82

[56] References Cited
UNITED STATES PATENTS
2,755,942  7/1956  Broberg ......................... 214/17
3,093,110  6/1963  Evans ............................. 214/17X
3,121,501  2/1964  Laidig ............................ 214/17
3,237,788  3/1966  Weaver et al. ................. 214/17

Primary Examiner—Robert G. Sheridan
Attorney—Andrus, Sceales, Starke and Sawall

ABSTRACT: This disclosure relates to a positive drive for a rotary cutter arm of a bottom unloader for a silo. A circular recess having sloping sidewalls is formed in the silo floor intermediate the length of the cutter arm. A sprocket is rotatably mounted by a shaft to the underside of the cutter arm. A rack including a plurality of spaced pins is mounted in a continuous ring in mesh with the sprocket. A hydraulic piston unit is mounted within the cutter arm and coupled by a ratchet drive to rotate the sprocket shaft and thereby the sprocket.

A deflection plate is secured to the leading side of the cutter arm and projects forwardly and downwardly from the arm into the recess to raise the silage upwardly from the recess into the cutter of the cutter arm.

Patented Oct. 27, 1970
3,536,211
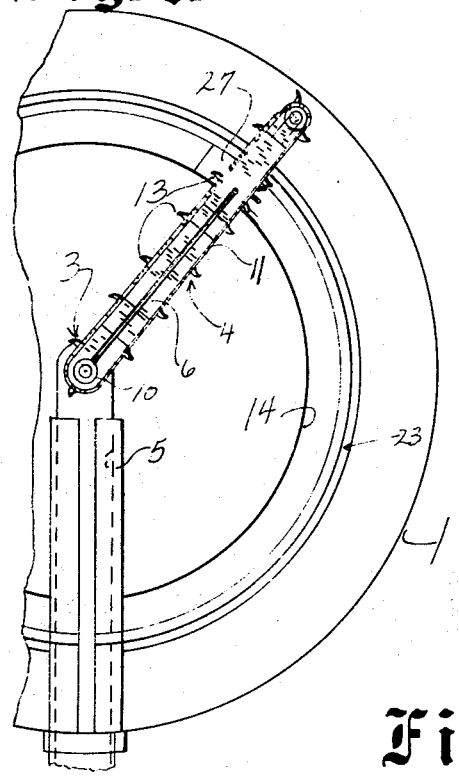
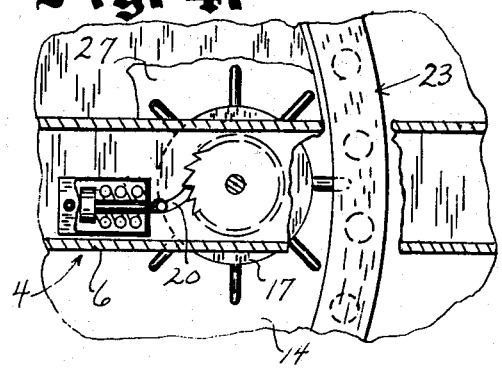
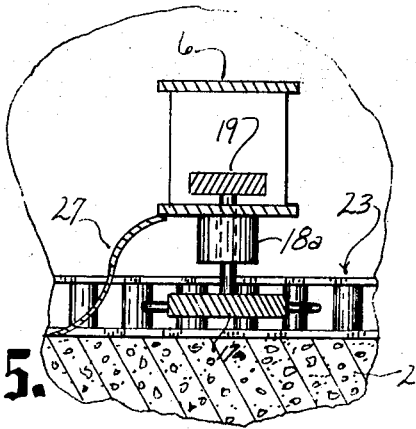
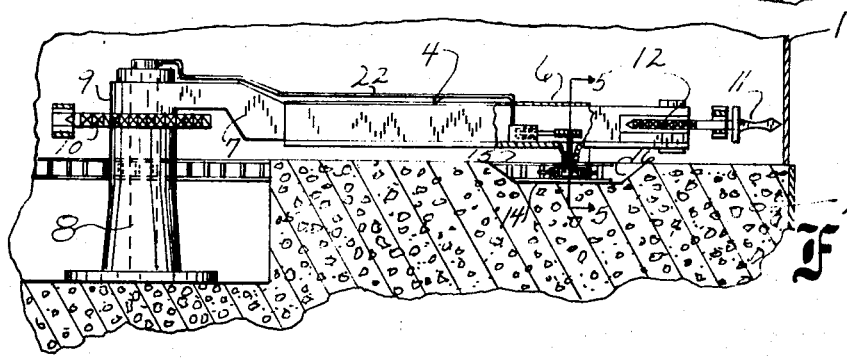
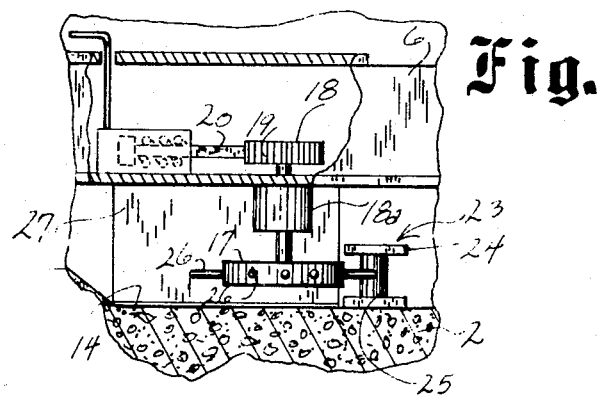
INVENTOR.
Wesley G. Martin
BY Andrews, Scales, Starks & Sowell
Attorneys

DRIVE SYSTEM FOR A ROTARY CUTTER ARM

This invention relates to a positive indexing drive system for a cutter arm mounted to undercut stored material in a storage structure such as a silo.

Storage structures such as silos are widely employed for storing of food products and the like for relatively long periods of time. A highly satisfactory automatic unloading system includes a bottom unloader; for example, as shown in U.S. Pat No. 2,755,942. The unloader is mounted in the floor or base of the storage structure to remove the material from the bottom of the structure and to convey the same exteriorly thereof. The cutting mechanism preferably includes a cutter arm which is centrally pivoted and includes means driven from the center of the structure to convey the material to the center of the structure and into a conveying means for removing the material. The cutter arm is rotated or indexed about the center of the structure to completely undercut all of the stored material.

In connection with a bottom unloader of this character, the cutter arm should be maintained in firm engagement with the face of the stored material. Where a relatively large diameter silo is employed and a corresponding long cutter arm is required, a center indexing drive has been found to present considerable difficulties from the standpoint of maintaining adequate torque to properly sweep or index the arm. Although various drive systems have been suggested for connection to the outer end of the cutter arm, such systems have certain disadvantages from the standpoint of accessibility and the transfer of input torque to the unit.

This invention is particularly directed to a positive drive means or mechanism which will not interfere with the normal movement of the cutting device and will not become clogged with silage and can be readily disengaged from the drive mechanism if it is necessary to remove the unloader. The cutting device of this invention may sweep close to the main supporting base for the stored material. Generally, in accordance with the present invention, an encircling recess is formed in the floor intermediate the length of the cutter arm. A sprocket-type rotating device is secured to the under side of the cutter arm and depends therefrom into the recess. A rack means such as a plurality of spaced pins is mounted in a continuous ring in mesh with the sprocket-type rotating device. The top of the rack is below the horizontal plane of the lowermost portion of the cutter arm and preferably below or coplanar with the structure floor. The depressed area or recess is made with inclined sidewalls to facilitate the removal of the unloader from the storage structure.

A material deflection plate may be secured to the leading side of the cutter arm and project forwardly and downwardly from the arm into the recess. The deflection plate would travel under any silage disposed in the depressed or recessed area and raise it upwardly into the blade of the cutter which would then carry it away. Any silage pushed through the open pin rack by the sprocket teeth could readily slide outwardly and upwardly on the inclined or sloping outer side of the recess without excessive packing which would interfere with the action of the unit. A drain means may be provided in the recessed area to remove any liquids which accumulate within the recess.

The present invention thus provides a simple, reliable and inexpensive means for driving of a cutter arm forming a part of an unloader.

The drawing furnished herewith illustrates the best mode presently contemplated by the inventor for carrying out the invention and clearly discloses the above advantages and features as well as others which will be readily understood from the following description of the illustrated embodiment.

In the drawing:

FIG. 1 is a horizontal section taken through a silo structure which incorporates a bottom unloader and a cutter arm drive constructed in accordance with the teaching of the present invention;

FIG. 2 is a side view of the cutter arm shown in FIG. 1 with parts broken away and sectioned;

FIG. 3 is a fragmentary enlarged view of a portion of FIG. 2;

FIG. 4 is a top view of FIG. 3; and

FIG. 5 is a view taken generally on line 5–5 of FIG. 2.

Referring to the drawing and particularly to FIGS. 1 and 2, the present invention is shown incorporated in a cylindrical storage structure such as a silo 1 which is adapted to contain silage or the like. The silo is disposed on a suitable concrete foundation 2 and projects vertically upwardly therefrom. A bottom unloader 3 is mounted within the silo 1 and includes a cutter arm 4 having one end interconnected to a drive mechanism at the center of the silo and extended radially outwardly therefrom. The cutter arm 4 is adapted to sweep over the floor of the silo 1 and the foundation 2 to continuously undercut the silage in the storage structure or silo 1 and move it to the center of the silo 1 and in particular, into the inner end of a radially extending trough 5 formed in the foundation 2. A suitable unloader unit, not shown, is removably mounted within the trough 5 and extends outwardly to the exterior of the silo through a suitable door structure. The unloader conveys the silage to the exterior of the silo.

Generally, the cutter arm 4 is similar to that disclosed in the previously referred to U.S. Pat. No. 2,755,942 and includes a generally rectangular hollow body 6 having a mounting insert 7 attached to the inner end thereof in any suitable manner. The mounting insert 7 is rotatably mounted on a vertical shaft 8 of a vertical center post assembly which is secured within a central well portion of trough 5 at the center of the silo 1. A rotatable hub 9 which carries a driven sprocket 10 attached thereto is secured to the central portion of the shaft 8 and interconnected in any suitable manner to a drive means, not shown, to establish rotary motion of the sprocket. An endless cutter chain 11 meshes with sprocket 10 and encircles the rectangular body 6 of the cutter with the outer end similarly supported by a suitable sprocket 12 secured to the opposite end of the cutter body. The rotation of the sprocket 10 causes the cutter chain 11 to move continuously about the cutter. A plurality of cutter teeth 13 are secured to the endless cutter chain 11 and serve to continuously dig into the adajacent silage, thereby undercutting and moving the silage into the inner end of the trough.

The present invention is particularly directed to a positive drive system to maintain indexing of a cutter arm 4 about the floor of the silo 1 and to thereby maintain the cutting teeth 13 digging into the silage.

The illustrated drive system which continuously indexes or rotates the cutter arm 4 about the shaft 8 includes an annular recess 14 formed in the foundation 2 intermediate the center post assembly and the outermost end of the cutter arm 4. The recess 14 is formed with generally sloping or inclined sidewalls 15 and 16 to form a relatively smooth transition between the supporting floor and the base of the recess 14.

A driven sprocket 17 is rotatably secured to the underside of the cutter arm 6 in alignment with the center portion of the recess 14. The sprocket 17 is secured to a shaft 18 which projects upwardly through a suitable hub 18a in the underside of the arm 6. The upper end of the shaft 8 terminates within arm 6 and is coupled through a suitable drive mechanism to establish continuous or timed rotation of the sprocket 17. The illustrated drive mechanism includes a ratchet wheel 19 secured to the shaft 18. A ratchet arm 20 is driven by a hydraulic actuated piston unit 21 having a spring return to produce stepped actuation of the sprocket 20. An operating line 22 is connected to unit 21 and extends inwardly to the center post assembly from which it may be connected to a periodic or pulsating pressure fluid source, not shown.

An annular rack 23 is secured to the base of the recess 14 in mesh with the sprocket 17. The illustrated rack 23 includes a pair of spaced top and bottom ring frames 24 interconnected with a plurality of circumferentially spaced steel pins 25 or the like. The bottom plate 24 is bolted or otherwise secured to the base of the recess 14 to support the rack 23 in fixed relation with respect to the sprocket 17. The pins 25 are spaced in accordance with the spacing of the teeth or prongs 26 of the sprocket such that the rotation of the sprocket 17 causes the sprocket to tend to move about the fixed rack 23. The positive rotation of the sprocket 17, therefore, cause the cutter arm 6 to index about the center post assembly and maintain the cutter chain 11 in firm cutting engagement with the silage.

The depressed area 14 permits the cutting device and particularly the cutting chain arm to cut immediately adjacent to the floor area to maintain optimum transfer of the silage for the removal to the center and to the removal trough. With the index mechanism disposed intermediate the arm length, the arm may extend to the outer silo wall 1 to provide complete removal of stored material.

Any silage which may move into the recess 14 will be forced by the sprocket 17 through the rack 23 and upwardly along the outer inclined wall 16 into the path of the cutter arm chain 11.

A curved deflection plate 27 is shown attached to the underside of the arm 6 along the leading edge and extending outwardly and downwardly therefrom into the recess 14. The lower end of the plate 27 is located in slightly spaced relation to the base of the recess 14. Although not required, the plate 27 would travel under any silage in the depressed area 14 and raise it into the cutter chain 11.

If the unloader is in the half of the structure opposite the unloader trough and an access door unit 28, the unloader proper can be physically pulled from the silo and the cutter arm will follow. The driving sprocket 17 will slide out of the depressed area 14 particularly as a result of the sloping or inclined side wall 15. If the cutter arm is disposed in the opposite half of the structure adjacent the trough, digging to the arm may be required to disenage the driving sprocket 17 such that the arm 6 could rotate freely as the unloader proper was pulled through the removal door.

The present invention thus provides a reliable and inexpensive means for positively indexing of the cutter arm structure forming a part of a bottom unloader for a silo or the like.

Various modes of carrying out the invention are contemplated as being within the scope of the following claims particularly pointing out and distinctly claiming the subject matter which is regarded as the invention.

I claim:

1. A drive system for a sweep cutter arm rotatably mounted at the center of a storage vessel and adapted to rotate within said vessel and undercut the stored material contained therein and move it to a discharge opening, which comprises a generally shallow circular recess having a top opening and an essentially closed side and bottom wall portion disposed within the base and concentrically of said vessel and lying in a plane substantially parallel to and beneath the plane circumscribed by said rotating cutter arm, a circular rack secured within said recess and having a plurality of spaced rack members defining rack teeth with a complete pass-through opening therebetween, the recess having a depth generally corresponding to that of the rack and being located generally intermediate the length of the cutter arm to position said rack beneath the cutter arm, sprocket means depending from the said cutter arm and disposed in position to engage said spaced rack members, and means to rotate said sprocket means about its axis to successively engage said rack and rotate said arm in a circular path, said sprocket means forcing stored material within said recess outwardly between said teeth.

2. The drive system for a sweep cutter arm of claim 1, wherein said circular recess includes a sloping inner sidewall immediately adjacent and extending inwardly from the base to allow said sprocket means to slide out of the recess.

3. The drive system of claim 1, wherein the means to rotate said sprocket member is disposed within said cutter arm.

4. The drive system of claim 1, wherein said sprocket means includes a drive shaft extending into the cutter arm, the means to rotate said sprocket member includes a hydraulic motor means mounted within said cutter arm and a ratchet drive means coupling the motor means to the drive shaft.

5. The drive system for a sweep cutter arm of claim 1, wherein said recess includes sloping sidewalls to the opposite sides of the rack means.

6. The drive system for a sweep cutter arm of claim 1, including a deflection plate secured to the arm in alignment with the recess, said deflection plate extending forwardly into said recess to raise stored material upwardly into the path of the cutter arm.

7. The drive system for a sweep cutter arm of claim 1, wherein said recess includes sloping sidewalls between the bottom of the recess and the vessel base, said sprocket means includes a shaft journaled in the bottom wall of said cutter arm with a sprocket disposed in position to engage said rack, and the means to rotate said sprocket means includes a hydraulic cylinder unit mounted within the cutter arm and coupled to said shaft by a ratchet drive unit.

8. The drive system for a sweep cutter arm of claim 7, including a deflection plate secured to the arm in alignment with the recess, said deflection plate extending forwardly into said recess to raise stored material into the path of the cutter arm.